United States Patent
Fischer et al.

(10) Patent No.: US 7,526,975 B2
(45) Date of Patent: May 5, 2009

(54) METHOD FOR REDUCING THE POWER ASSISTANCE FOR A GEARSHIFTING UNIT OF A VEHICLE TRANSMISSION

(75) Inventors: Dieter Fischer, Nonnenhorn (DE); Klaus Späth, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 822 days.

(21) Appl. No.: 10/535,830

(22) PCT Filed: Nov. 22, 2003

(86) PCT No.: PCT/EP03/13139

§ 371 (c)(1), (2), (4) Date: May 23, 2005

(87) PCT Pub. No.: WO2004/048817

PCT Pub. Date: Jun. 10, 2004

(65) Prior Publication Data

US 2006/0053928 A1    Mar. 16, 2006

(30) Foreign Application Priority Data

Nov. 28, 2002    (DE) ................................ 102 55 395

(51) Int. Cl.
*F16H 59/00*    (2006.01)
*F16H 61/00*    (2006.01)
*F16H 63/00*    (2006.01)

(52) U.S. Cl. ............................... 74/335; 74/339; 477/78

(58) Field of Classification Search .................... 74/335, 74/339, 473.1, 473.19, 473.2, 745; 477/78
See application file for complete search history.

(56) References Cited

U.S. PATENT DOCUMENTS

| | | | |
|---|---|---|---|
| 5,150,296 A | | 9/1992 | Iwatsuki et al. |
| 6,012,345 A | | 1/2000 | Wafzig et al. |
| 6,109,126 A | | 8/2000 | Cochran et al. |
| 6,319,171 B1 | * | 11/2001 | Hughes et al. ............... 477/111 |
| 6,361,473 B1 | * | 3/2002 | Mason et al. ................ 477/124 |
| 6,439,082 B1 | * | 8/2002 | Onuki .......................... 74/745 |
| 7,290,460 B2 | * | 11/2007 | Fischer ........................ 74/335 |

FOREIGN PATENT DOCUMENTS

| | | |
|---|---|---|
| DE | 197 54 726 A1 | 6/1999 |
| DE | 198 39 854 A1 | 3/2000 |
| DE | 100 29 497 A1 | 1/2002 |
| DE | 102 17 482 A1 | 11/2003 |
| EP | 0 926 400 A2 | 6/1999 |
| EP | 1 092 894 A2 | 4/2001 |

* cited by examiner

*Primary Examiner*—David D. Le
(74) *Attorney, Agent, or Firm*—David & Bujold, P.L.L.C.

(57) ABSTRACT

A gearshifting unit for a vehicle transmission (6) comprising a main transmission part (10) manually shifted by the vehicle driver using a gearshift lever (16) and one range change group transmission (14) shifted by valves (44, 46). The gearshifts are manually preselectable by the vehicle driver using a gearshift lever (16), the same as a power assistance device (74) for shifting the gear steps in the main transmission part (10) and one electronic control device (20) which actuates the valves (44, 46). In a method for reducing the power assistance, a neutral position is detected in the manually shifting main transmission part (10) and once the neutral position is determined, the gearshift begins in the range change group transmission part (14) and the power assistance is engaged with a delay.

7 Claims, 4 Drawing Sheets

METHOD FOR REDUCING THE POWER ASSISTANCE FOR A GEARSHIFTING UNIT OF A VEHICLE TRANSMISSION

This application is a national stage completion of PCT/EP2003/013139 filed Nov. 22, 2003 which claims priority from German Application Serial No. 102 55 395.5 filed Nov. 28, 2002.

FIELD OF THE INVENTION

The invention relates to a method for operating a gearshifting unit.

BACKGROUND OF THE INVENTION

Transmissions of large commercial vehicles are divided into one main transmission part, one splitter group transmission and one range change group transmission. At the same time, modern transmissions, mainly in commercial vehicles, have one gearshifting device assisted by a pneumatic system which carries out the pneumatic gearshifts in the splitter group transmission and in the range change group transmission, while the gearshifts in the main transmission are manually carried out by a vehicle driver and, at the same time, can be assisted by the pneumatic system in an effort to be exerted.

DE 198 39 854 A1 has disclosed a gearshifting device where one power assistance device assists the driver's shifting effort. The supply of the assisting compressed air should be reduced here, for example, be admitted only, when the vehicle clutch is actuated. This requires additional valves that make a reduction possible. The disclosure of DE 198 39 854 A1 in all its contents is to be the object of this description.

DE 100 29 497 A1 has disclosed an electropneumatic gearshifting unit for a multi-ratio vehicle transmission in which a multiplicity of controlled valves shift the transmission comprised of several units while, at the same time, electronically monitored to prevent faulty functions. To that end, the valves are controlled by a central vehicle guide computer. The disclosure of DE 100 29 497 A1 in all its contents is also to be the object of this description. Modulation of the assisting force takes no place.

From DE 102 17 482, an electropneumatic gearshifting unit has finally become known where one changeover valve is provided for a vehicle transmission that comprises one main transmission manually shifted by the vehicle driver using a gearshift lever and one splitter group transmission electropneumatically shifted via valves. The gearshifts of the splitter group transmission are manually preselectable by the vehicle driver using switches on the gearshift lever. One sensor or switch detects a manual actuation of the vehicle clutch by the vehicle driver and relays the signal to an electronic control device which then opens the valves. One changeover valve is provided which, with one inlet aperture, is connected with one outlet line of the valves. The valves open every time a clutch actuation signal is present, there always opening the one of the two valves which had been preselected on the gearshift lever in the last actuation of the switches for the splitter group transmission. One outlet aperture of the changeover valves is connected, via one pneumatic line, with one pneumatic power assistance device which assists the vehicle driver when manually shifting in the main transmission. The changeover valve admits only the air supply from one of the two valves of the splitter group transmission to the pneumatic line and thus to the power assistance device while the other connecting line is shut off by the changeover valve. It is thereby prevented that the attached gearshift cylinder for the splitter group transmission receives an air supply for its two gearshifting devices. Air is to be received only by the connecting line and thus only by the part of the gearshifting cylinder that had also been preselected. It is being unimportant whether the preselection was actually effected recently by the vehicle driver or resulted in the last corresponding actuation of the switches on the gearshifting lever. For the pneumatic line and thus for the power assistance device, it is indifferent which of the two sides of the gearshifting cylinder receives air. The power assistance device should always receive air when engaged. During the gearshifting process in the main transmission, if no gearshift occurs in the splitter group transmission then, during actuation of the clutch, the same valve is again controlled which was already controlled and shifted during the last gearshift of the splitter group transmission. Thereby this valve allows air into the changeover valve and thus into the power assistance device without changing the position of the gearshifting cylinder of the splitter group transmission itself.

In mechanical transmissions having a main transmission and range change group transmission, it is possible to select the gear in the main transmission part during developing gearshift in the range change group transmission and already to apply a more or less strong manual shifting effort against a pin bolt that locks the main transmission. If the transmission has been equipped with a power assistance device, the latter is released subject to the already applied manual shifting effort, that is, a very specific pressure builds up in the power assistance device. If the gearshift is now terminated in the range change group transmission, the pin bolt again releases the gearshift in the main transmission. The power assistance device, already pressurized, acts now as a prestressed spring and accelerates the selector rod and gearshift sleeve to a high speed which results in, that if the sliding sleeve appears on the synchronizer unit, the synchronizer unit no longer locks, but grates producing loud noises. The gearshifts that produce grating noises considerably impair the duration of the synchronizer units and of all the gearshift parts. Before the failure of the transmission, this can also lead to complaints relative to the noise and to the operation of the gearshifting unit thus causing unscheduled plant stoppages.

The problem on which the invention is based is to determine the supply of assistance medium of a gearshifting device and to prevent damages without added expenses.

The problem is solved by a method having the features of claim 1 for reducing the power assistance to a gearshifting unit. Developments are object of sub-claims.

SUMMARY OF THE INVENTION

A gearshifting unit for a vehicle transmission comprising one main transmission part manually shifted by the vehicle driver using a gearshifting lever; one range change group transmission shifted via valves, the gearshifts of which are manually preselectable by the vehicle driver using the gearshifting lever, and one power assistance device for shifting the gear steps in the main transmission part. One electronic control device actuates the valves. For this gearshifting unit, a method is proposed for reducing the power assistance by first detecting the neutral position in the manually shifted main transmission part using adequate means and, with the detection of the neutral position, the gearshift begins in the range change group transmission part. The gearshifting begins in the range change group transmission, the power assistance for the main transmission part being engaged with delay. A means suited for detecting the neutral position can be, for example, a device which, besides the range position of a signal for a started interlocking function, allows the starter to actuate only when the main transmission part is in a neutral position so as to present an unintended forward jump of the vehicle during start of the engine. Such a device exists in many vehicles.

In an advantageous development of the method, after the beginning of the gearshift, the termination of the gearshift in the range change group transmission is also detected and determined and, after this detection of the termination of the gearshift in the range change group transmission, there results the engagement of the power assistance for the main transmission part. The termination of the gearshift can be detected, for example, by determining the shift stroke of the selector rod of the interlock or of the gearshift shaft with adequate mans. In one other advantageous development, after the beginning of the gearshift, the delayed engagement of the power assistance for the main transmission part occurs only after lapse of a predetermined time. When the transmission oil temperature and the rotational speed are the same, the complete gearshift of the range change group transmission occurs always at the same time, which means that with the detection of a neutral signal in the main transmission part a delayed engagement of the power assistance can result so that the latter coincides precisely with the end of the gearshift in the range change group transmission. In one development of the method, the transmission oil temperature is detected an the length of this preset time, up to the delayed engagement of the power assistance for the main transmission part, is determined according to the detected oil temperature of the transmission. In another development, the length of the preset time up to the delayed engagement of the power assistance for the main transmission part is determined according to a transmission output rotational speed which is likewise detected.

In a specially advantageous execution of the method, the power assistance for the main transmission part is engaged with delay after lapse of a preset time until at the end thereof the conclusion of the gearshift in the range change group transmission part is expected in the usual manner. At an oil temperature of 80° C., for example usual in transmission, a gearshift process in the range change group transmission lasts a time, detectable as example and experimentally. This experimentally detected time is preprogrammed in the control device and made the basis as an expected shifting time.

If the power assistance in the main transmission part is not engaged until the gearshift is terminated in the range change group, the power assistance device is not prestressed and grating gearshifts and damages are prevented.

BRIEF DESCRIPTION OF THE DRAWINGS

The invention will now be described, by way of example, with reference to the accompanying drawings in which.

DETAILED DESCRIPTION OF THE INVENTION

Figure 1:
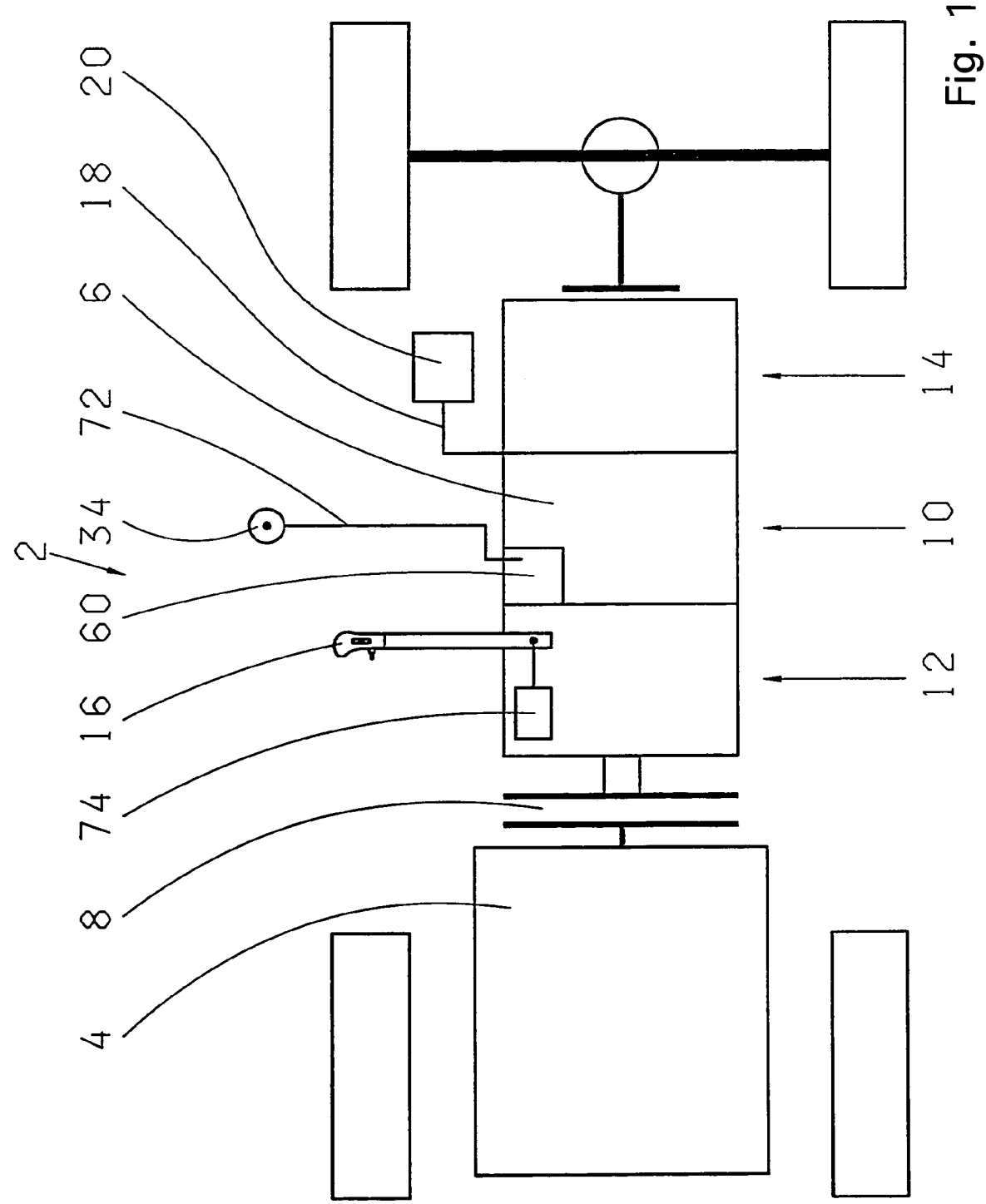
FIG. 1 is a diagrammatic representation of an arrangement of the transmission.

FIG. 1 shows one vehicle 2 having one prime mover 4, one transmission 6 and one clutch 8 disposed therebetween. The transmission 6 has one main part 10, one splitter group transmission 12 and one range change group transmission 14. The main transmission part 10 is manually shifted by the vehicle driver via a gearshift lever 16. The transmission 6 is connected, via connecting lines 18, with an electronic control device 20. One valve block 60 is located in the housing of the transmission 6 and connected, via a feed line 72, with an air tank 34. One power assistance device 74 mounted on or in the housing is operatively connected with the gearshift lever or the elements in the main transmission part 10 actuated by the gearshift lever.

Figure 2:
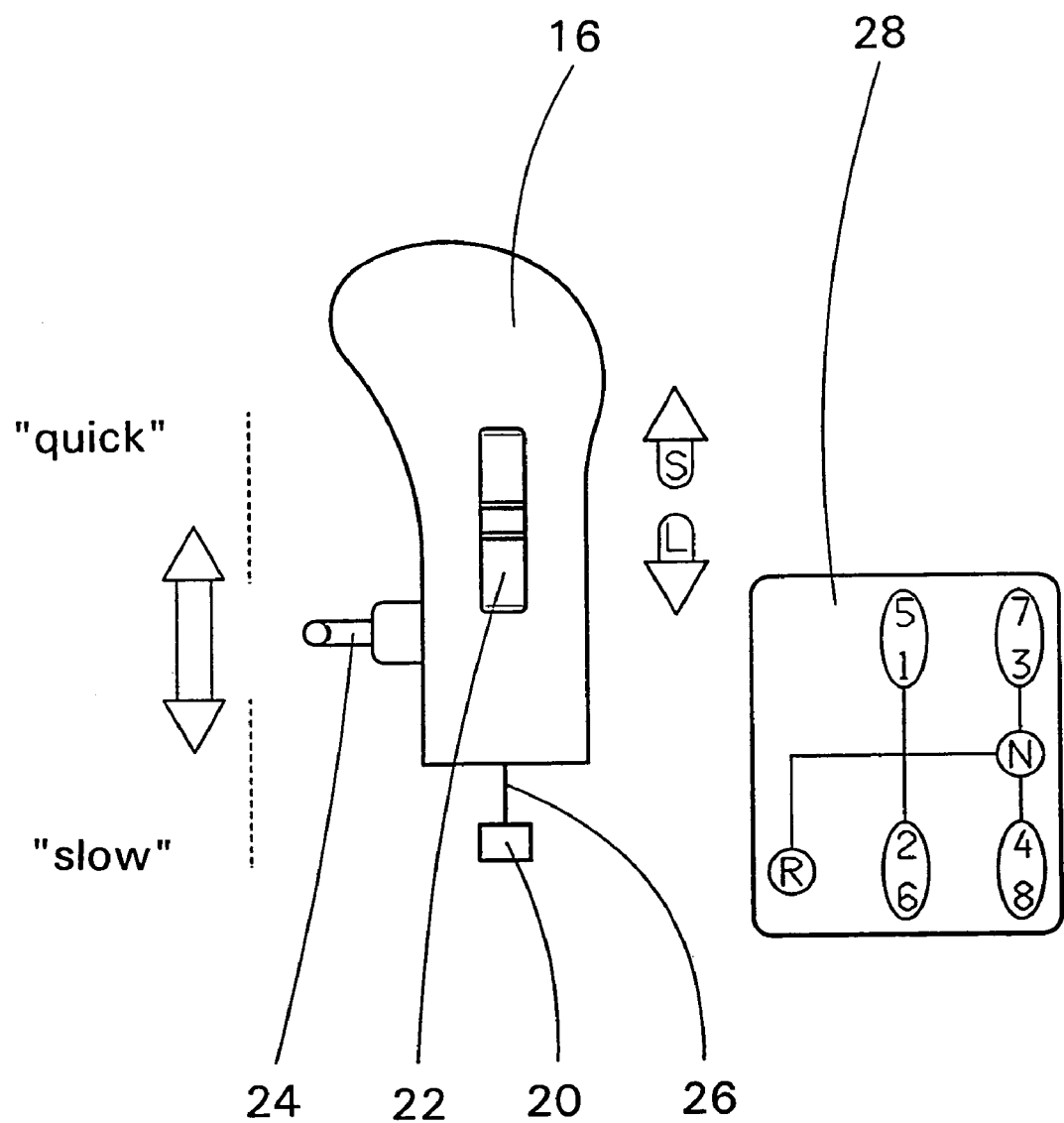
FIG. 2 is a typical gearshifting knob with gearshift pattern.

FIG. 2 shows, by way of example, an enlarged representation one gearshift lever 16 for a gearshift pattern 28 designated as "superposed H". On the side of the gearshift lever 16 is situated one toggle switch 22 for preselecting the gearshift of the splitter group transmission 12. On the front side of the gearshift lever 16 is provided one other toggle switch 24 by way of which the range change group transmission 14 is shifted. The two toggle switches 22, 24 are electric switches connected via an electric connecting line 26 with the control device 20. When shifting with the gearshift pattern 28 to the forward gears, each end position of the gearshift lever 16 is coordinated with two ratio steps which differ by the speed ratio change of the range change group transmission 14. In the rocker lever position "slow", the reduction ratios one to four and the reverse gear are shifted; in the rocker lever position "quick", the gears five to eight are shifted. The neutral position of the main transmission part 10 is indicated in the gate between the reduction ratios three and four or seven and eight.

The vehicle driver has to preselect the change of the range change group transmission 14 by way of the toggle switch 24 on the gearshift lever 16. The change is carried out as soon as the neutral position has been manually introduced in the main transmission part 10.

Figure 3:
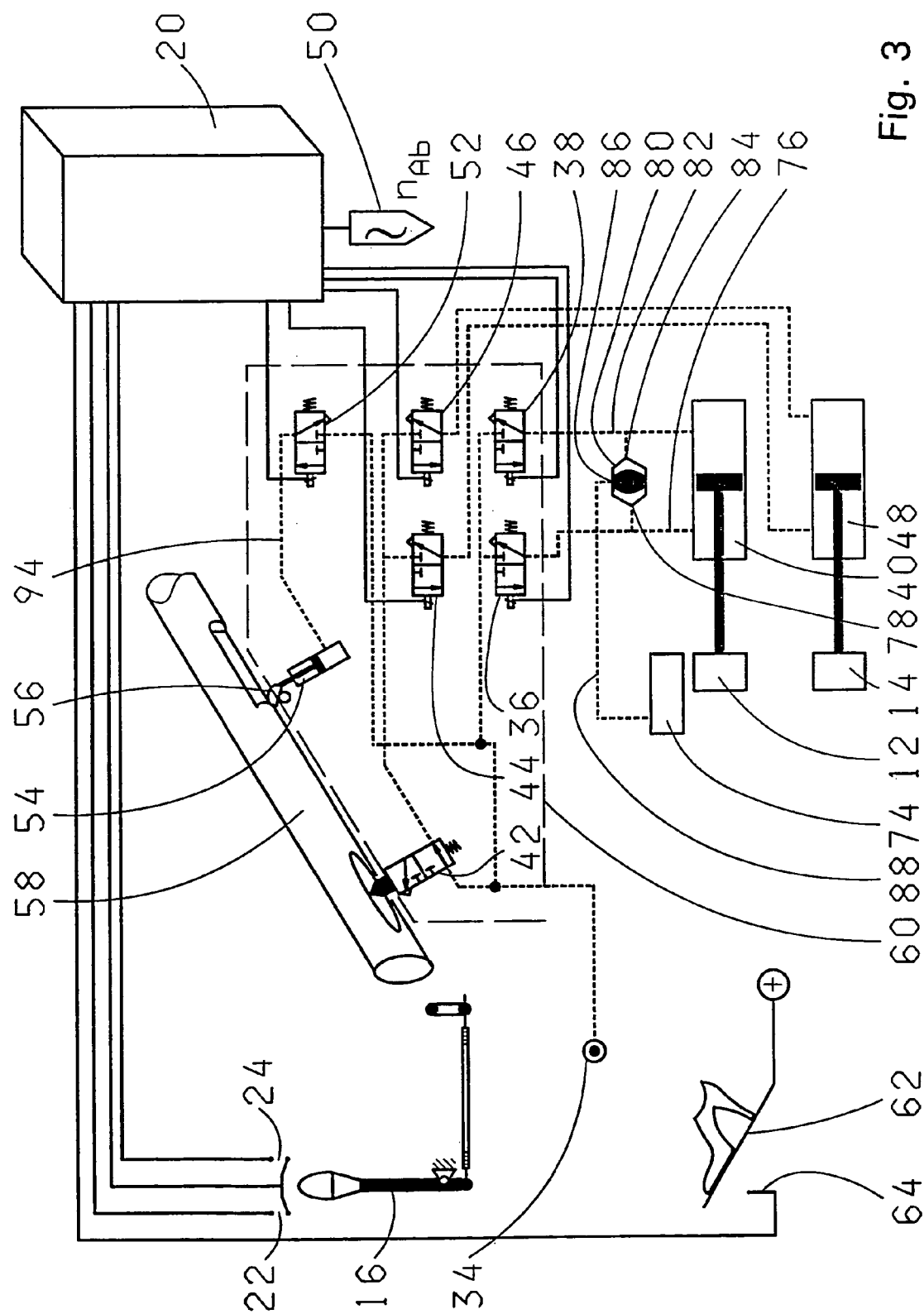
FIG. 3 is one development of the gearshifting unit.

The splitter group transmission 12 is preselected in the positions "L" or "S" with the toggle switch 22 on the side of the gearshift lever 16 and shifted by actuating the clutch 8. For the purpose, FIG. 3 shows one clutch pedal 62 which actuates one electric switch 64 which is connected with the control device 20. The admission of gearshifts in the splitter group transmission 12 is determined in this arrangement from the control device 20 when the switch 64 is closed; air permanently outcropping on two electropneumatic 3/2 directional valves 36 and 38. The valves 36 and 38 are connected with the electronic control device 20 and controlled according to the position of the toggle switch 22 on the gearshift lever 16. When the clutch pedal 62 is stepped on, air is admitted either in the left or in the right chamber of a gearshift cylinder 40 of the splitter group transmission 12, the respective other chamber being then deaerated via the valves 36 and/or 38.

As previously stated, the vehicle driver has to preselect the change of the range change group transmission 14 by way of the toggle switch 24 on the gearshift lever 16. The change is carried out as soon as the neutral position has been manually introduced in the main transmission part 10. In the neutral position, one main shut-off valve 42 mechanically coupled with the shifting motion releases the air from the air tank 34 to two electropneumatic 3/2 directional valves 44 and 46. The valves 44 and 46 are connected with the electronic control device 20 and controlled, depending on the position of the toggle switch 24, on the gearshift lever 16. When the neutral position has been detected by the main shut-off valve 42, air is admitted via the respectively controlled valve 44 or 46 either in the left or in the right chamber of the gearshift cylinder 48 of the range change group transmission 14 whereupon the respective other chamber is deaerated via the uncontrolled valve 46 and/or 44.

To prevent faulty gearshifts, additional protections must be provided in the gearshift device. To that end, a locking cylinder 54 is provided which, preferably in the slow ratio step of the range change group transmission 14 above a certain output rotational speed of the transmission 6, prevents the shifting from the right gearshift gate of the gearshift pattern 28 to the left gearshift gate, that is, shifting from the third or fourth ratio step to the first or second ratio step is prevented. This should keep the vehicle driver from erroneously shifting to the first instead of to the fifth ratio step when he has forgotten to preselect with the toggle switch 24 the quick ratio in the range change group transmission 14. In the quick ratio step of the range change group transmission 14 the same device can be used to prevent gearshifts from the eighth to the fifth ratio step. The output rotational speed of the transmission 6 is detected by a sensor 50 and relayed as a signal to the electronic control device 20. The control device 20, at too high an output rotational speed, emits a signal to an electropneumatic 3/2 directional valve 52, which allows air from the tank 34 to reach, via a line 94, the gate locking cylinder 54; the tappet of which engages, via a reversing lever 56, a selector shaft 58 pressing it in direction of the right gearshift gate of the gearshift pattern 28. This arrangement can be reinforced at an increased expenditure of effort and, in extreme situations, thus allow the shifting of the ratio step to the left gearshift gate of the gearshift pattern 28.

Above a preset vehicle speed, a range change interlock decreases the gearshift of the range change group transmission 14 to the slow ratio and protects both the synchronizer unit of the range change group transmission 14 to the slow ratio and protects both the synchronizer unit of the range change group transmission 14 and the synchronizer units of the main transmission part 10. The vehicle speed is detected by the sensor 50, according to the transmission output rotational speed, and relays it as signal to the control device 20. According to the signal, the control device 20 actuates the valve 44 and/or 46 and allows a gearshift to the slow ratio only in the presence of corresponding admissible signals.

The valves 36, 38, 42, 44, 46, 52 and 54 are accommodated together in the valve block 60 as common housing which is directly mounted on a housing where the selector shaft 58 of the transmission 6 is located. Thereby results a compact unit of the valve block 60 which is situated on the transmission 6 (FIG. 1). By virtue of a short length of the line between the individual valves, brief reaction and shifting periods advantageously result. The electric connection between valve block 60 and the control device 20 can result via one central electric connection on the valve block 60. The valve block 60 can be attached to an existing transmission without structural changes of the transmission being required.

One outlet line 76 leads from the valve 36 to the gearshift cylinder 40 of the splitter group transmission 12 and to a first inlet aperture 78 of a changeover valve 80. One outlet line 82 leads from the valve 38 to the gearshift cylinder 40 of the splitter group transmission 12 and to a second inlet aperture 84 of the changeover valve 80. If the changeover valve 80 receives air from one of the inlet apertures 78 or 84, it closes the respective other inlet aperture 84 or 78. Thereby no air reaches an unintended work chamber of the gearshift cylinder 40. One outlet aperture 86 of the changeover valve 80 is connected with a pneumatic line 88 to which the power assistance device 74 is attached. If the pneumatic lines and the passages are sufficiently dimensioned, the air flowing through the pneumatic line 88 suffices to produce enough force in the power assistance device 74.

Figure 4:
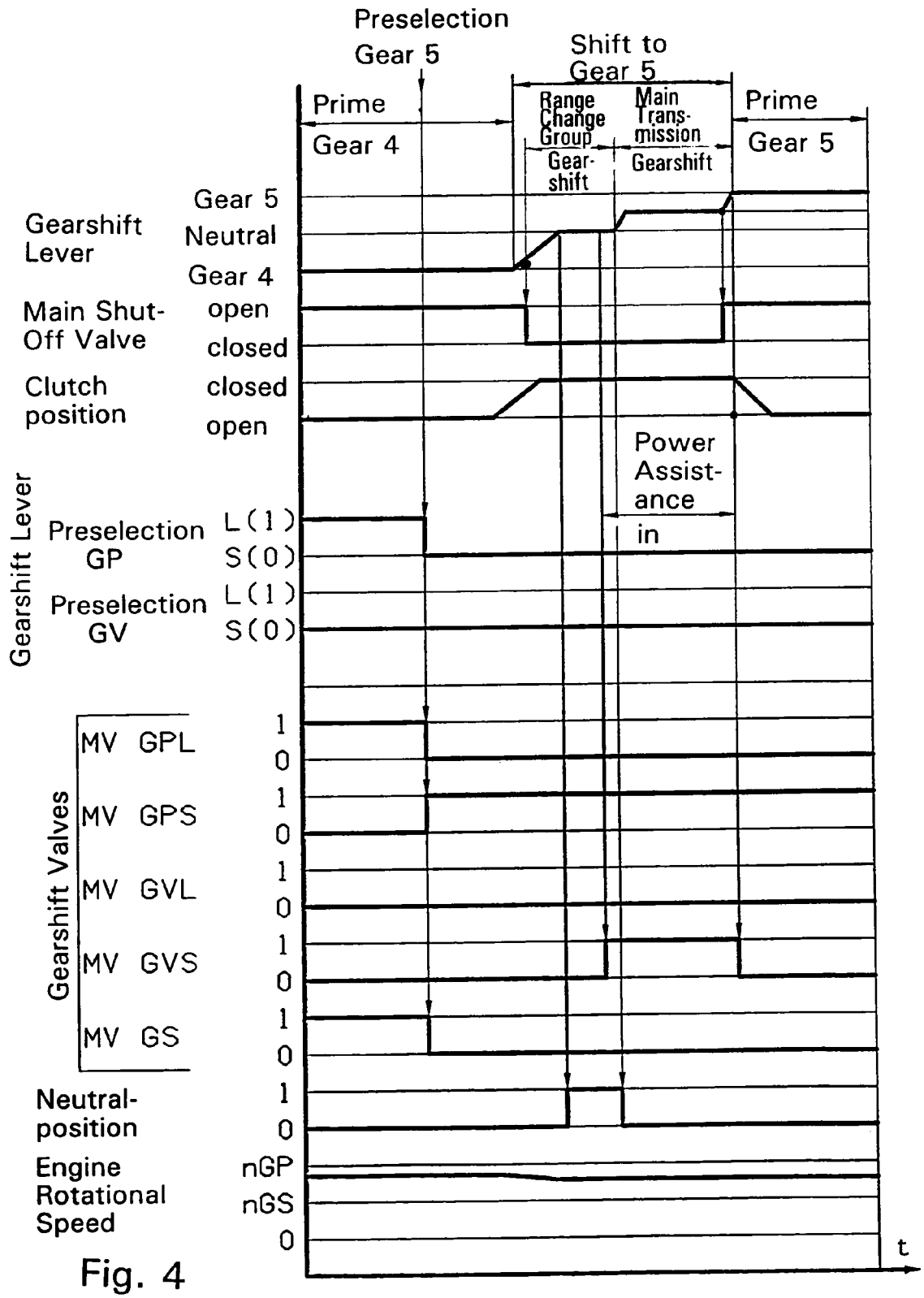
FIG. 4 is the timed course of the gearshift.

FIG. 4 shows the timed shifting cycle in the main transmission part 10 and in the range change group transmission 14 for the different elements taking part in the gearshift. A gearshift is shown from the fourth gearshift step introduced in the main transmission 10 when a slow shifting step is introduced in the range change group transmission 14 to a first gear step in the main transmission 10 when a quick gearshift step is introduced in the range change group transmission 14. This corresponds practically to a gearshift from the fourth to the fifth gear on the condition that no gearshift occurs in the splitter group transmission 12.

On the time axis t is first described the driving state in the fourth gear as initial gear which then changes over during the gearshifting operation from the fourth to the fifth gear and terminates in the driving state in the fifth gear. The fifth gear is preselected while driving in the fourth gear. The gearshift operation is divided into the gearshift in the range change group transmission 14 and the gearshift in the main transmission part 10. During the transition of both gearshifts, there lightly overlappingly sets in the engagement of the power assistance which here sets in with a delay of, for example, up to 0.3 seconds after detection of the neutral position.

While driving in fourth gear the gearshift lever 16 is in the position of the fourth gear according to the gearshift pattern 28. This remains the same when on the gearshift lever 16 the toggle switch 24 is actuated for preselecting the shifting of the range change group transmission 14 to the fifth gear. The toggle switch 22 for preselection of the shifting of the splitter group transmission 12 remains unchanged throughout the shifting operation. The gearshift lever 16 is moved in the direction of the neutral position after the clutch position has been changed from "Zu" to "Auf" by actuation of the clutch pedal 62. Due to the movement of the gearshift lever 16, the main shut-off valve 42 is actuated and opened and allows air to reach the valves 44 ("MV GPL") and 46 ("MV GPS"). During the preselection of the range change group shift, the valve 46 ("MV GPS") is opened (0=>1) while simultaneously the valve 44 ("MV GPL") is closed (1=>0) and the valve 52 is, likewise, closed whereby the gate locking cylinder 54 unlocks. After the gearshift lever 16 has reached the neutral position, the neutral position detection shifts from 0 to 1 and the power assistance is engaged with delay. After lapse of the retardation time and/or after detection of the introduced quick gearshift steps in the range change group transmission 14, the control device 20 opens the valve 38 ("MV GVS") and allows air to reach the power assistance device 74, via the changeover valve 80, as long as the clutch pedal 62 is actuated.

During this period, the gearshift of the range change group transmission 14 from the slow to the quick shifting state completes itself. When the clutch 8 is open, the gearshift lever 16 is moved in direction to the gearshifting position for the fifth gear according to the gearshift pattern 28, and the neutral position detection shifts from 1 to 0. The gearshift position for the fifth gear is reached only after the synchronization operation has terminated in the main transmission part 10. The main shut-off valve 42 is closed again and blocks the air supply to the valves 44 and 46. The clutch 62 is subsequently closed again and the vehicle moves in fifth gear.

| Reference numerals | |
|---|---|
| 2 | vehicle |
| 4 | prime mover |
| 6 | transmission |
| 8 | clutch |
| 10 | main transmission part |
| 12 | splitter group transmission |
| 14 | range change group transmission |
| 16 | gearshift lever |
| 18 | connecting line |
| 20 | control device |
| 22 | toggle switch |
| 24 | toggle switch |

-continued

| Reference numerals | |
|---|---|
| 26 | connecting line |
| 28 | gearshift pattern |
| 34 | air tank |
| 36 | valve |
| 38 | valve |
| 40 | gearshift cylinder |
| 42 | main shut-off valve |
| 44 | valve |
| 46 | valve |
| 48 | gearshift cylinder |
| 50 | sensor |
| 52 | valve |
| 54 | gate locking cylinder |
| 56 | reversing lever |
| 58 | selector shaft |
| 60 | valve block |
| 62 | clutch pedal |
| 64 | switch |
| 72 | feed line |
| 74 | power assistance device |
| 76 | outlet line |
| 78 | inlet line |
| 80 | changeover valve |
| 82 | outlet line |
| 84 | inlet aperture |
| 86 | outlet aperture |
| 88 | pneumatic line |
| 94 | line |

The invention claimed is:

1. A method for reducing power assistance on a gearshifting unit during shifting of a vehicle transmission (6) comprising a main transmission part (10), which is manually shifted by a vehicle driver using a gearshift lever (16), a range change group transmission (14) which is shifted by valves (44, 46) such that gearshifts of the range change group transmission (14) being manually preselectable by the vehicle driver via one or more switches (22, 24) located on the gearshift lever (16), a power assistance device (74) for aiding in the shifting of gear steps in the main transmission part (10) and an electronic control device (20) which actuates the valves (44, 46), the method comprising the steps of:

initiating a shift of gear ratios in the range chance group transmission (14) by manipulating a range group toggle switch (24);

manually initiating a shift in the main transmission part (10) by biasing the gearshift lever (16);

detecting a neutral position of the manually shifted main transmission part (10);

only shifting the gear ratios in the range change group transmission (14) once the neutral position is detected; and engaging the power assistance after a delay of time from the detection of the neutral position of the manually shifted main transmission part (10).

2. The method according to claim 1, further comprising the step of detecting termination of the gearshift in the range change group transmission (14) and engaging the power assistance after the termination is detected.

3. The method according to claim 1, further comprising the step of delaying engagement of the power assistance until after lapse of a preset delay of time.

4. The method according to claim 3, further comprising the step of detecting a temperature of oil in the transmission and determining the preset delay of time according to the detected temperature of the oil in the transmission.

5. The method according to claim 3, further comprising the step of detecting an output rotational speed of the transmission and determining the preset delay of time according to the detected output rotational speed of the transmission.

6. The method according to claim 3, further comprising the step of delaying engagement of the power assistance until after lapse of the preset delay of time usually expected for termination of the gearshift in the range change group transmission (14).

7. The method according to claim 6, further comprising the step of determining the preset delay of time after an amount of time usually needed for the gearshift at a predetermined oil temperature of oil in the transmission.

* * * * *